J. M. PROUDFIT.
BOOK LEAF.
APPLICATION FILED JUNE 19, 1905.
1,107,351. Patented Aug. 18, 1914.
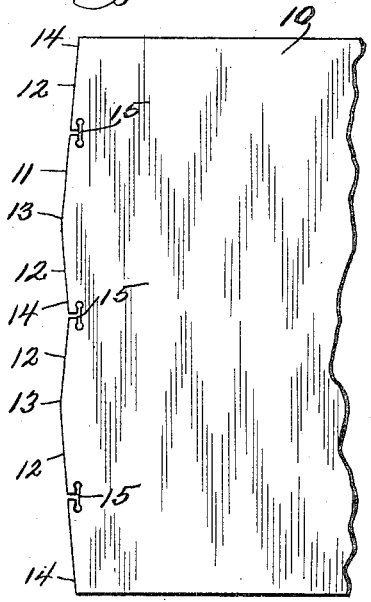
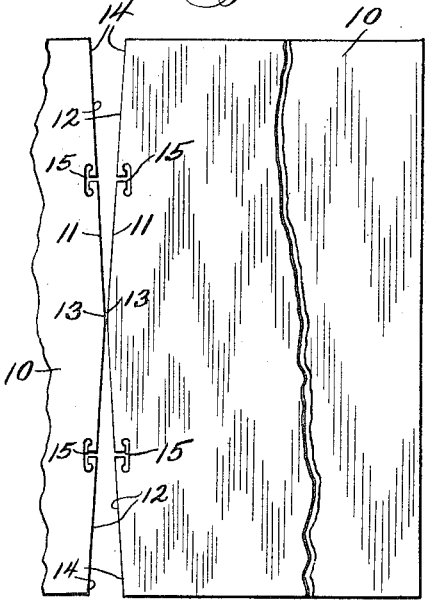
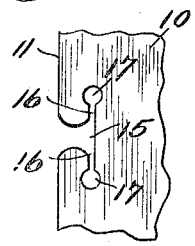
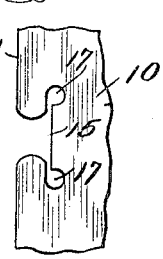
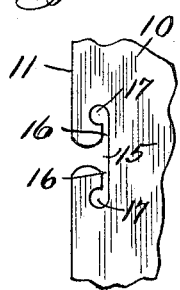
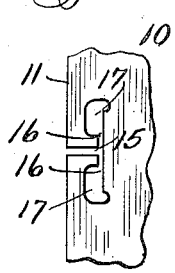
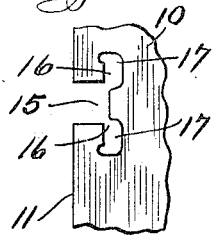
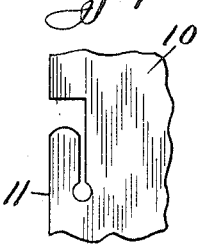
Witnesses:
Fred J. Schad
C. L. Cross.
Inventor:
James M. Proudfit
By R. J. Jacker
Atty

UNITED STATES PATENT OFFICE.

JAMES M. PROUDFIT, OF CHICAGO, ILLINOIS.

BOOK-LEAF.

1,107,351.	Specification of Letters Patent.	Patented Aug. 18, 1914.

Application filed June 19, 1905. Serial No. 266,041.

*To all whom it may concern:*

Be it known that I, JAMES M. PROUDFIT, a citizen of the United States, residing at Chicago, in the county of Cook and State of Illinois, have invented a new and useful Book-Leaf, of which the following is a specification.

My invention relates to the construction of the binding edge of the leaf which is especially adapted for loose leaf books in which the leaves are individually detachably secured to leaf holding strips; and the objects of my invention are first, to provide a leaf which can easily be attached to and removed from the leaf holding strips; second, to make a leaf which will not be easily mutilated from contact with the binding strips; third, to so construct leaves that their connection to the leaf holding strips will hold them in perfect alinement; fourth, to decrease the frictional surface between the leaf and the leaf holding strip; fifth, to prevent the binding edges of the leaves from being crumpled from contact with each other when brought together for binding purposes; and other objects to become apparent from the description to follow.

Heretofore leaves for loose leaf books have been made with T or L shaped notches in the edge of the same for attaching them to the leaf holding strip, tape or bar. These had several objectionable features; for instance, some, in order to secure them in alinement, had the T or L shaped notches made to fit snug about the leaf holding members and were very difficult to attach to or remove from said members, and were also easily torn; some, to avoid such difficulties were provided with T or L shaped notches that fitted very loosely about the leaf holding members, which permitted the leaves to lie out of alinement and was an annoyance to the user; some, leaves were made to fit the leaf holding members so snugly as to cause so much friction that it was impossible to shift a number of leaves laterally on said members and the user was obliged to shift the leaves one or a few at a time; and as far as I know all leaves for use in loose leaf binders have heretofore had their binding edge cut in a straight line, which in certain constructions of binders caused the said binding edges of the leaves to be crumpled unless very great care was taken by the user when manipulating the binder. All these objectionable features are overcome by the use of my invention which consists of enlarging the extremities of the T or L shaped notches and trimming the binding edge of the leaf on a slant or several separate slants.

To more fully describe my invention I have illustrated the same on the accompanying sheet of drawing forming a part of this specification, in which:

Figure 1, is a plan view of a leaf partly broken away embodying my invention; Fig. 2, is a plan of two leaves partly broken away with their binding edges opposed to each other showing the slanting edge of the leaves; Fig. 3, is a fragmental cross sectional view through a binder in an open position to permit the removal of a leaf from, or the insertion of a leaf into, the same; Fig. 4, is an enlarged detail and Figs. 5, 6, 7, 8 and 9 show modifications.

Similar reference characters refer to similar parts throughout the several views.

The leaf 10 is of any desired shape and size and its binding edge 11 is cut on a slant the entire width of the leaf or to form a number of slanting edges 12 which terminate in the apexes 13 and the depressions 14, and is also provided with T shaped notches 15 having the extremities of their branches enlarged, the contour of said enlargement being preferably on a curved line. When the leaf 10 is in position in a binder a flat leaf holding strip rests in each T shaped notch 15, being approximately wide enough to extend from the extreme end of one branch 16 to the extreme end of the other branch 16. It will be understood that to remove the leaf 10 from the leaf holding spring the portions of the leaf lying between the edge 11 and the branches 16 must be bent substantially at right angles to the plane of the leaf.

In Fig. 4, is shown the preferred construction of the T shaped notch, which is with the enlargement 17 extending as far beyond one side of the branch 16 as it does on the other. In Fig. 5, the enlargement 17 is shown as extending beyond the branch 16 only toward the front of the leaf and in Fig. 6 the enlargement 17 is shown as extending beyond the branch 16 only toward the rear of the leaf.

By forming the enlargement 17 at the extremities of the branches 16 the edges of the strip do not bear upon the paper laterally and the danger of tearing at this point is avoided and the length of the edges of the notch which contact with the leaf holding strip is reduced and therefore the amount of frictional contact between the leaf and the leaf holding strip is reduced. To reduce this frictional contact between the leaf and the leaf holding spring still more, the enlargement 17 may be extended farther along the branch 16 as shown in Figs. 7 and 8. The enlargement 17 may also be provided on the extremity of L shaped slots as shown in Fig. 9.

Fig. 3, shows leaves strung on a leaf holding strip being brought together at their binding edges just previous to being tightly bound together by pulling on the leaf holding strip, and Fig. 2, shows a plan of the same with the leaf holding strip omitted. If the back edges of the leaves are trimmed squarely so that the entire back edges of the leaves approaching each other come into contact simultaneously it is very difficult to manipulate them so as to prevent portions of the back edges of the leaves from being crumpled, thus forcing the leaves out of alinement. To overcome this difficulty, the back edges of the leaves are trimmed on a slant as previously referred to. When the back edges of the leaves are brought together as shown in Figs. 2 and 3, the leaves will first contact at the apexes 13. It is an easy task to guide the leaves at these few points of contact and when they are properly guided at such points or apexes the remaining portion of the edge 11 will naturally be guided in the proper direction on account of the slanting edges 12.

I am not aware that the back edges of leaves have ever been trimmed so that only portions of the leaves will contact first when their back edges are brought together, and I therefore lay claim broadly to any leaf having its binding edge so trimmed.

Having thus fully described my invention what I claim as new and desire to secure by Letters Patent of the United States is:—

1. A leaf having its binding edge provided with a plurality of securing apertures and said edge trimmed to have the edge of the leaf between the securing apertures extend beyond the edge of the leaf at the apertures.

2. A book leaf having its binding edge provided with securing apertures and said binding edge cut on converging lines so as to have one or more points remote from said securing apertures extending beyond the remaining portion of said edge.

In testimony whereof I have signed my name to this specification in presence of two subscribing witnesses this 16th day of June 1905, at Chicago, Illinois.

JAMES M. PROUDFIT.

Witnesses:
 ROZINE R. SYMONS,
 R. J. JACKER.

Copies of this patent may be obtained for five cents each, by addressing the "Commissioner of Patents, Washington, D. C."